United States Patent [19]

Schlichte

[11] 3,906,161

[45] Sept. 16, 1975

[54] METHOD FOR SWITCHING PULSE CODE MODULATED SIGNALS USING TIME-DIVISION MULTIPLEX PRINCIPLES

[75] Inventor: Max Schlichte, Munich, Germany

[73] Assignee: Siemens Aktiengesellschaft, Berlin & Munich, Germany

[22] Filed: May 15, 1973

[21] Appl. No.: 360,568

[30] Foreign Application Priority Data

May 26, 1972 Germany ..................... 2225702

[52] U.S. Cl. ............................................ 179/15 AQ

[51] Int. Cl.² ............................................ H04J 3/00

[58] Field of Search...... 179/15 AQ, 15 AT, 18 AG, 179/15 A, 15 AL

[56] References Cited

UNITED STATES PATENTS

| | | | |
|---|---|---|---|
| 3,223,784 | 12/1965 | Inose et al. | 179/15 AQ |
| 3,632,883 | 1/1972 | Aagaard | 179/15 AQ |
| 3,678,205 | 7/1972 | Cohen et al. | 179/15 AQ |
| 3,736,381 | 5/1973 | Johnson | 179/15 AQ |
| 3,740,480 | 6/1973 | Krupp | 179/15 AQ |

*Primary Examiner*—Kathleen H. Claffy
*Assistant Examiner*—Joseph Popek

[57] ABSTRACT

A method is described for effecting the connection of time division multiplex trunks. Through-connecting units are used which cause time channel conversion and spatial through-connection. These through-connecting units form with a spatial switching network a time division multiplex coupling array having the known time-space construction. If on an outgoing trunk selected for a desired connection and at the output with which a connection is to be established there is no common free time position, an adjacent time position is used. The latter is made possible by means of the timing on the spatial portion of the coupling array. An intermediate storage is used to bridge the time periods between time slots. This storage is disposed at the output of the spatial portion of the time division multiplex coupling array.

1 Claim, 2 Drawing Figures

METHOD FOR SWITCHING PULSE CODE MODULATED SIGNALS USING TIME-DIVISION MULTIPLEX PRINCIPLES

BACKGROUND OF THE INVENTION

In telephone switching systems in which the time-division multiplex principle is applied, pulse code modulation (PCM) has gained special significance in recent years. In this type of modulation, instantaneous values of the amplitude of the speech signal are represented by binary words, which are then transmitted at successive intervals of time.

The major purpose of a PCM switching system, then, resides in carrying out the switching functions necessary to connect the binary words which appear on the PCM time-division multiplex trunks leading to the central office in time channels, which, on said trunks, are allocated to the individual cells, to the PCM time-division multiplex trunks selected in accordance with the desired call and leading away from the central office. In conformity with the four-wire operating generally used for PCM time-division multiplex trunks entering the central office or outgoing therefrom, the switching is always a four-wire switching operation. That is, both direction of transmission are to be considered separately when switching. In so doing, the same time channel within the particular pulse frame is each time used for transmitting binary words to be transferred in the course of a connection over a PCM time-division multiplex system. The pulse is generated by the sending central office. This is done for purposes of control with a view to attaining uniformity in the time channels employed for both directions of transmission in the individual time-division multiplex central offices involved in a transmission (see, e.g., Proc. IEE III (1964) 12, 1976 to 1980, 1976).

In accordance with the problems which occur in performing a PCM time-division multiplex switching process, an essential part of the switching centers employed for carrying out such a process is formed by switching networks comprising timing circuits and spatial circuits. The timing circuits have intermediate storages, wherein the PCM signals are buffered during the time interval between the incoming and outgoing time channels. The spatial circuits comprise crosspoint switches operated in cycles and by pulses, over which incoming time-division multiplex trunks can be connected with outgoing time-division multiplex trunks. In accordance with the functional sequence of such timing or spatial circuits, various switching network constructions are possible, the convenience of which depends on the conditions imposed on the switching system.

By way of example, a space-time-space (S-T-S) system consists of an input spatial circuit followed immediately by the storages, the outputs of which are connected to the inputs of a second output spatial circuit. This switching network construction has the characteristic that the centrally arranged intermediate storages of the timing circuit can repeatedly be employed in the time-division multiplex system, and is particularly advantageous in synchronous telecommunication networks, since no storages are required therein at the input and output of the switching systems. A disadvantage of this switching network structure resides in the fact that the possibility of gradually expanding these switching centers cannot be accomplished economically justifiable expenditure, because a minimum number of storages having the basic capacity must be committed in advance.

In contrast, switching networks having the T-S structure are more advantageous in this respect. On the input side, they have timing circuits allocated to individual lines for converting an incoming to an outgoing time channel followed immediately by a spatial switching network, whose crosspoint contacts are activated in the course of the time channels to which conversion was made through the timing circuit. Switching networks constructed in this manner can be expanded without difficulty and are particularly of interest for asynchronous switching systems, wherein intermediate storages on the output side are required at any rate for purposes of synchronization.

The problem of time channel congestion is particularly important in PCM time-division multiplex switching networks having the T-S configuration, since there is a relatively great probability that no more free timing circuit outputs can be found for time channels which are free in the spatial of the switching network or on outgoing PCM trunks.

Consequently, according to a prior art concep for a PCM time-division multiplex switching system (W. Neu and A. Kündig in Colloque International de Commutation Electronique, Paris, Mar. 28 to Apr. 2, 1966, pages 513–520), the time-division multiplex switching network of the central office is composed of switching units (see FIG. 1), wherein any PCM trunk connected to the outputs thereof has access to any outgoing PCM trunk connected to the inputs thereof. Refering to FIG. 2 these switching units D include a storage having a number of digit planes EV, corresponding to the number of the combined incoming PCM time-division multiplex trunks, into which the PCM data supplied by the assigned PCM time-division multiplex trunk Anl to An16 (FIG. 1) are entered concurrently after a series/-parallel conversion, and into which all PCM data supplied within a pulse frame on a PCM time-division multiples trunk can be stored.

The readout from the storage of these switching units takes place in succession for the individual digit planes, for which an appropriate increase in the sampling rate is required. Thereafter, a distribution of the data among the outgoing PCM time-division multiplex trunks takes place over a spatial switching network K. Thus, if by means of such a switching unit, e.g., 16 PCM time-division multiplex trunks are grouped together, the storage for the group has 16 digit planes in which, depending on the number of channels in a pulse frame and on the number of bits of the PCM words transferred in a time channel, there are 32 storage locations for every 8 bits. Since in this way, in the course of a pulse frame, 512 words that can be stored in the switching unit storage are read out successively, as indicated hereinabove, a 125/512 microsecond interval is available for reading out an individual PCM word. Due to the increase in the sampling interval during the readout, as compared to the instants of time offered during the write-in, there is complete freedom of congestion in this type of switching unit.

The construction of a PCM time-division multiplex switching network in the form of a single congestion-free through-connecting unit fails in the face of the costs which increase exponentially with the number of grouped PCM time-division multiplex trunks, and also because the increase in the sampling rate during the readout from the storage is subject to limitations. Hence, the above described time-division multiplex coupling arrays using congestion-free through-connecting units are made up of a plurality of such congestion-free through-connecting units.

Likewise, in another prior art PCM time-division multiplex switching procedure (West German Examined Patent Application 1 762 270) utilizing a time-division multiplex coupling array having a T-S configuration, there are provided switching units which, viewed individually, are free of, or at least as low, in congestion. This is accomplished by effecting the readout from the storage of the timing circuit thereof at a greater sampling rate than is in accord with the system frequency on the PCM time-division multiplex trunks. In the spatial portion of the switching group there are available for this case more than one time interval for a connection. Here, too, the through-connection takes place using a parallel bit arrangement. In the course of the reconversion in serial form at the output end a time differential, if any, between the actually utilized through-connecting time in the spatial portion of the switching group and between the start of the time slot wherein the retransmission on an outgoing PCM time-division multiplex trunk takes place, is compensated through buffering in the parallel/series converter.

Here, too, it is not possible, for reasons of economy, to build up comparatively large systems by using a single such switching unit.

However, grouping together these switching units into a switching group having a T-S configuration (which is of interest due to the expansion possibility of the aforementioned switching groups) by using through-connecting or switching units as described hereinabove and eliminating timing circuits disposed in a further switching-group circuit by means of a spatial switching-group section, the, of course, time-channel problems characteristic of switching groups having a T-S configuration will again be encountered for the switching group as a whole.

An object of this invention is, therefore, to provide a method of connecting time-division multiplex trunks by means of a time-division multiplex coupling array composed of individual congestion-free or lowcongestion time-division multiplex trunks, such that there is little danger of time-channel congestion.

SUMMARY OF THE INVENTION

The invention provides a method of connecting time-division multiplex trunks of a time-division multiplex telecommunication exchange transmitting PCM signals, by means of a plurality of switching units each having, at least, low-congestion time. The switching units form with a spatial coupling array shared therewith a time-division multiplex coupling array having a timespaced configuration.

This method is characterized by the fact that, if on the outgoing time-division multiplex trunk selected according to the desired connection and at the output of the through-connecting unit with which a connection is to be established, there is no common free time slot, the latter is shifted forward to an adjacent time slot by means of the through-connecting timing of the spatial portion of the time-division multiplex coupling array. This determines the timing of the through-connecting unit with respect to the free time slot provided on the selected outgoing time-division multiplex trunk for seizure. The time interval between the time slots is bridged through buffering in an intermediate storage disposed at the output of the spatial portion of the time-division multiplex coupling array.

Since, according to the claimed method, a non-recurring time-channel conversion is basically adhered to and during the second time-channel conversion provided in cases of congestion from the forward shifted throughconnecting phase to the time channel whose cyclic repetition produces the time channel seized on the outgoing time-division multiplex trunk, only the time intervals between adjacent time slots are to be bridged. As the timedivision multiplex coupling array, according to the requisite condition, is made up of through-connecting units having congestion-free or low-congestion time channels, one can, in carrying out the method, fundamentally adhere to the use of a time-division multiplex coupling array having a T-S configuration with its aforementioned favorable prerequisites for an expansion of the switching group. The buffers to be attached to the output end of the switching group are only small auxiliary storage devices of known construction, e.g. core storages.

BRIEF DESCRIPTION OF THE DRAWINGS

The principles of the claimed method will be more readily understood by reference to the detailed description given hereinbelow of a preferred apparatus for performing the method in conjunction with the drawings in which:

DETAILED DESCRIPTION OF THE DRAWINGS

Figure 1:
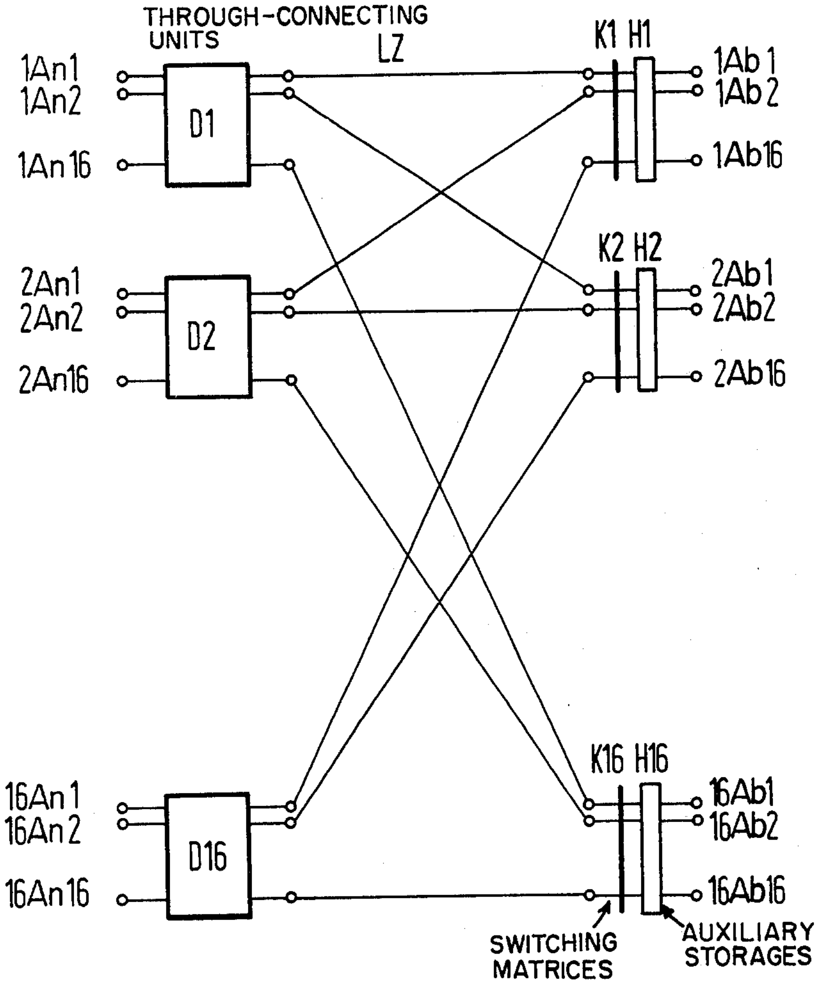
FIG. 1 is a block-schematic drawing, of a time division multiplex coupling array for a time division multiplex tandem exchange constructed in accordance with the description given hereinabove to have congestion-free through-connecting units
Figure 2:
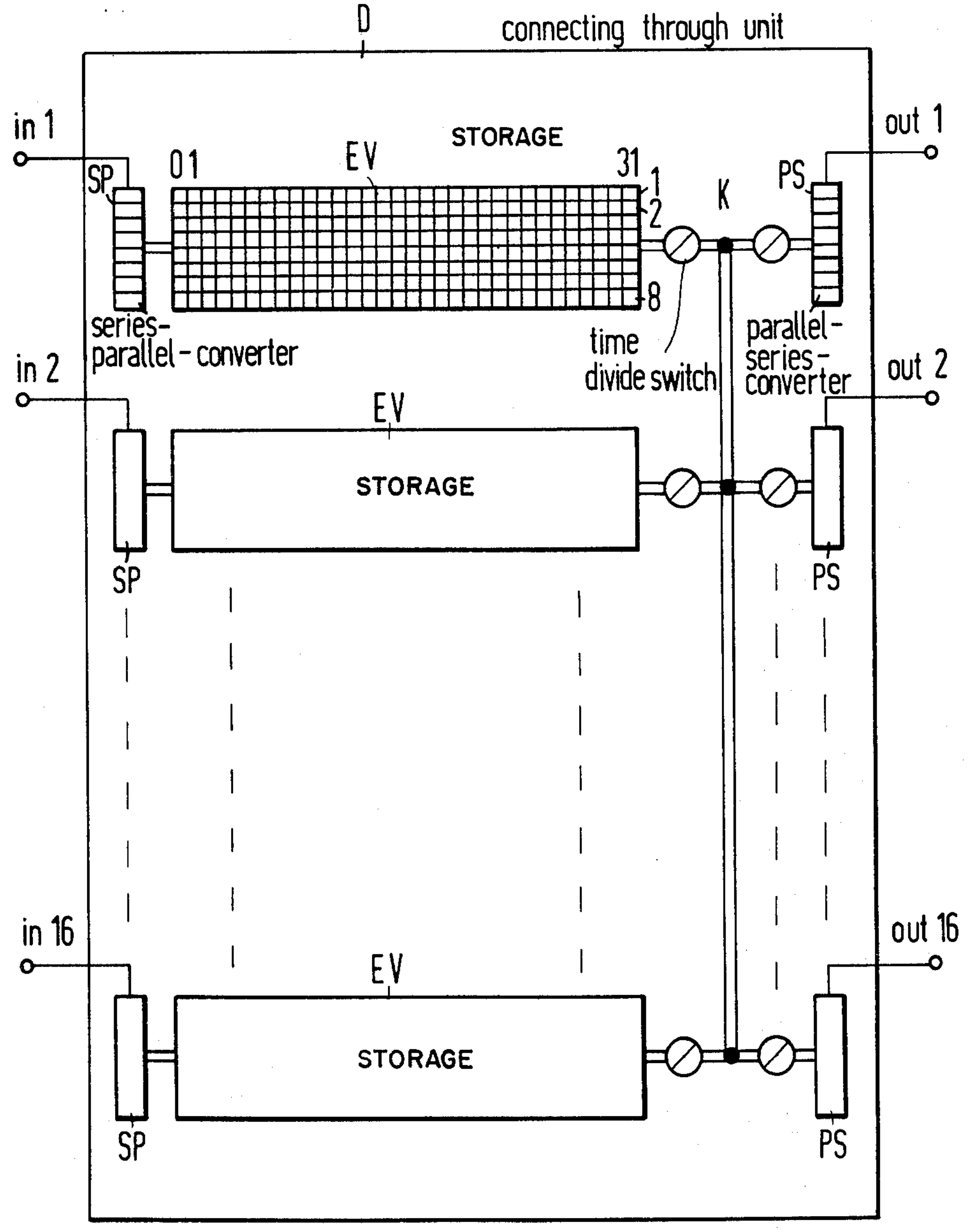
FIG. 2 is a schematic drawing illustrating the construction of the through-connecting unit in the FIG. 1 embodiment prior art.

The PCM time-division multiplex coupling array shown in FIG. 1 has 16 through-connecting units D1 to D16, which cause a time-channel conversion as well as a spatial through-connection of the PCM time-division multiplex trunks connected thereto. These through-connecting units are operated such that their time channels are free of congestion, which, as described hereinabove, can be achieved in that the readout from the storage takes place at an increased clock frequency. Each of these through-connecting units groups together 16 incoming PCM time-division multiplex trunks An1 to An16, which are each connected with another input of these through-connecting units.

Each of the outputs of the through-connecting units D1 to D16 is connected with an input each of another spatial switching matrix K1 to K16. By way of example, the first output of the through-connecting unit D1 is connected with the first input of the switching matrix K1, the second output thereof with the first input of the switching matrix K2. Corresponding connections exist between the outputs of the through-connecting units D2 to D16 with the inputs of the switching matrices K1 to K16.

The outgoing time-division multiplex trunks of the matrices K are connected to the outputs of the switching matrices K1 to K16 over auxilary storages H1 to H16, each of which enables a timing conversion into an adjacent time slot.

Since in the construction of the time-division multiplex coupling array referenced hereinabove, the incoming time-division multiplex trunks grouped by the individual through-connecting units can be connected with more outgoing PCM time-division multiplex trunks than the number of outputs of the through-connecting units, the overall arrangement is no longer free of congestion, although according to the requisite condition the time channels of the individual through-connecting units shall be free of congestion.

However, the procedure according to the invention reduces the danger of time-channel congestions. For purposes of illustration, let it be assumed that by means of the time-division multiplex coupling array shown a connection is to be established from the incoming PCM time-division multiplex trunk 1An1, which is connected to the through-connecting unit D1, to the outgoing PCM time-division multiplex highway 16Ab16, which is connected to an output of the switching matrix. Another requisite condition is that on the selected outgoing time-division multiplex trunk 16Ab2, the time channel 19 shall be seized as the next free time channel. Now, if at the first output of the through-connecting unit D1 this time channel is no longer free, thereby causing a time channel congestion, the through-connecting phase is shifted forward to the time slot corresponding to an adjacent time channel, e.g., the time channel 18, by means of corresponding control of the time-channel conversion in the through-connecting unit D1. Since the entire time-division multiplex coupling array is made up of through-connecting units having congestion-free or low-congestion time channels, there is a relatively great probability that this time channel is free. At any rate, the danger of time-channel congestion can be reduced over the total number of the connections to be handled by a central office of this type. Thus, in the case under study, in the link arrangement LZ and in the spatial switching matrix K16 leading to the selected outgoing PCM time-division multiplex trunk 16Ab16, the time slot corresponding to the time channel 18 is utilized. The time differential between the utilized time slot and the time slot corresponding to the time channel selected on the PCM time-division multiplex trunk 16Ab16 is compensated by the auxiliary buffer H16 allocated to the switching matrix K16.

The method of the invention is described hereinabove by means of describing its application to otherwise known apparatus. It is contemplated that the described apparatus can be modified or changed, or other apparatus used, while operating within the scope of the invention, as defined by the appended claims.

I claim:

1. A method for selecting an outgoing time channel for permitting the completion of a connection between time-division multiplex trunks transmitting pulse code modulated (PCM) signals through a time-division multiplex exchange installation having a plurality of through-connecting units, each of which has time channels having little congestion, each said throughconnecting unit including means for causing time channel conversion and spatial through-connection, said through-connecting units being coupled to a spatial switching network to form a time-division multiplex array in a timespace configuration, comprising the steps of:

shifting, if on the outgoing multiplex trunk selected according to the connection desired, and at the output of a said through-connecting unit with which a connection is to be established there is no free common time slot, the time slot of the said through-connecting unit to an adjacent time slot, by means of selecting the crosspoints of the spatial portion of the coupling array which will complete the connection through said adjacent time slot, determining the time relationship of said through-connecting unit time slot with respect to the outgoing time channel time slot to be seized and bridging the time interval between the two time slots occupied, respectively, by said through-connecting unit and said outgoing time channel by providing storage for said through-connecting unit time slot at the output of said spatial switching network.

* * * * *